United States Patent
Hou et al.

(10) Patent No.: US 11,953,609 B2
(45) Date of Patent: Apr. 9, 2024

(54) VEHICLE POSITIONING METHOD, APPARATUS AND AUTONOMOUS DRIVING VEHICLE

(71) Applicant: BEIJING BAIDU NETCOM SCIENCE TECHNOLOGY CO., LTD., Beijing (CN)

(72) Inventors: Shenhua Hou, Beijing (CN); Yuzhe He, Beijing (CN); Liang Peng, Beijing (CN); Guowei Wan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/711,339

(22) Filed: Apr. 1, 2022

(65) Prior Publication Data
US 2022/0229193 A1 Jul. 21, 2022

(30) Foreign Application Priority Data
Sep. 29, 2021 (CN) .......................... 202111152008.6

(51) Int. Cl.
*G01S 19/48* (2010.01)
*G01S 19/49* (2010.01)
(Continued)

(52) U.S. Cl.
CPC ............ *G01S 19/48* (2013.01); *G01S 19/485* (2020.05); *G01S 19/49* (2013.01); *G01S 19/53* (2013.01);
(Continued)

(58) Field of Classification Search
CPC ........ G01S 19/53; G01S 19/48; G01S 19/485; G01S 19/49; G01S 19/45; G01S 19/47; G01S 5/0258; G01S 5/0257
(Continued)

(56) References Cited

U.S. PATENT DOCUMENTS 6,240,367 B1 * 5/2001 Lin ..................... G01C 21/28
                                                    701/472
9,031,782 B1 * 5/2015 Lemay .................. G06T 7/277
                                                    701/445
(Continued)

FOREIGN PATENT DOCUMENTS

CN        103777220 A      5/2014
CN        106840179 A      6/2017
(Continued)

OTHER PUBLICATIONS

Office Action of corresponding Chinese Patent Application No. 202111152008.6, dated May 31, 2022, 14 pages.
(Continued)

*Primary Examiner* — Chuong P Nguyen
(74) *Attorney, Agent, or Firm* — Tucker Ellis LLP

(57) ABSTRACT

The present disclosure provides a vehicle positioning method, an apparatus and an autonomous driving vehicle, relating to autonomous driving in the technical field of artificial intelligence, which can be applied to high-definition positioning of the autonomous driving vehicle, the method including: if there is no high-definition map in a vehicle, acquiring intermediate pose information of the vehicle based on a global navigation satellite system and/or an inertial measurement unit in the vehicle, and determining the intermediate pose information as global positioning information; acquiring local positioning information; performing fusion processing to the global pose information and the local pose information to obtain fused pose information; performing compensation processing to the fused pose information according to the global attitude angle information and the local attitude angle information to obtain a position of the vehicle.

18 Claims, 8 Drawing Sheets

(51) Int. Cl.
*G01S 19/53* (2010.01)
*G01S 5/02* (2010.01)
*G01S 19/45* (2010.01)
*G01S 19/47* (2010.01)

(52) U.S. Cl.
CPC ............ *G01S 5/0258* (2020.05); *G01S 19/45* (2013.01); *G01S 19/47* (2013.01)

(58) Field of Classification Search
USPC .............. 342/357.28, 357.3, 357.31, 357.32, 342/357.36
See application file for complete search history.

(56) References Cited

U.S. PATENT DOCUMENTS

| | | | | |
|---|---|---|---|---|
| 9,057,781 | B2 * | 6/2015 | Bando | G01S 5/017 |
| 9,285,460 | B2 * | 3/2016 | Haglund | G01C 9/06 |
| 10,206,066 | B1 | 2/2019 | Bavand et al. | |
| 11,435,186 | B2 * | 9/2022 | Chen | G01S 19/49 |
| 11,435,485 | B2 * | 9/2022 | McDaniel | G01C 21/165 |
| 11,550,067 | B2 * | 1/2023 | Reimer | G01S 19/54 |
| 11,662,478 | B2 * | 5/2023 | Reimer | G01S 19/53 342/352 |
| 11,834,054 | B2 * | 12/2023 | Palella | G01S 19/47 |
| 2018/0373264 | A1 | 12/2018 | Madsen et al. | |
| 2020/0134866 | A1 | 4/2020 | Kitaura et al. | |
| 2021/0174516 | A1 | 6/2021 | Kang et al. | |
| 2021/0278216 | A1 * | 9/2021 | Faragher | G01C 21/005 |
| 2022/0080979 | A1 * | 3/2022 | Palella | G01C 21/165 |
| 2023/0134569 | A1 * | 5/2023 | He | G06V 20/58 382/104 |

FOREIGN PATENT DOCUMENTS

| | | | | |
|---|---|---|---|---|
| CN | 206224239 | U | 6/2017 | |
| CN | 107478214 | A | 12/2017 | |
| CN | 108040324 | A | 5/2018 | |
| CN | 108827306 | A | 11/2018 | |
| CN | 109116397 | A | 1/2019 | |
| CN | 109974704 | A | 7/2019 | |
| CN | 110095116 | A | 8/2019 | |
| CN | 110207714 | A | 9/2019 | |
| CN | 110262525 | A | 9/2019 | |
| CN | 111046125 | A | 4/2020 | |
| CN | 111340867 | A | 6/2020 | |
| CN | 111413721 | A | 7/2020 | |
| CN | 111511017 | A | 8/2020 | |
| CN | 111551186 | A | 8/2020 | |
| CN | 111649739 | A | 9/2020 | |
| CN | 111947671 | A | 11/2020 | |
| CN | 111982102 | A | 11/2020 | |
| CN | 112197770 | A | 1/2021 | |
| CN | 112484722 | A | 3/2021 | |
| CN | 112817019 | A | 5/2021 | |
| CN | 113820735 | A * | 12/2021 | ............. G01S 19/47 |
| CN | 115032672 | A * | 9/2022 | ............. G01S 19/45 |
| EP | 3644015 | A1 | 4/2020 | |
| EP | 4113063 | A1 * | 1/2023 | ........... G01C 21/005 |
| JP | 2020-067439 | A | 4/2020 | |
| WO | 2016/048849 | A1 | 3/2016 | |
| WO | 2020/168464 | A1 | 8/2020 | |

OTHER PUBLICATIONS

Translation of Office Action of corresponding Chinese Patent Application No. 202111152008.6, dated May 31, 2022, 10 pages.
"VINS-MONO translation and theoretical derivation series (4): VIII global pose graph optimization, IX experimental results", https://blog.csdn.net/neptune4751/article/details/107251551, Apr. 1, 2022, 22 pages.
European Search Report of corresponding European Patent Application No. 22166719, dated Sep. 16, 2022, 11 pages.
Notice of Reasons for Refusal of corresponding Japanese Patent Application No. 2022-131184, dated Oct. 17, 2023, 10 pages.

* cited by examiner

VEHICLE POSITIONING METHOD, APPARATUS AND AUTONOMOUS DRIVING VEHICLE

CROSS-REFERENCE TO RELATED APPLICATIONS

This application claims priority to Chinese Patent Application No. 202111152008.6, filed on Sep. 29, 2021, which is hereby incorporated by reference in its entirety.

TECHNICAL FIELD

The present disclosure relates to autonomous driving in the technical field of artificial intelligence (Artificial Intelligence, AI), which can be applied to high-definition positioning of an autonomous driving vehicle, and in particular, to a vehicle positioning method, an apparatus and an autonomous driving vehicle.

BACKGROUND

With the development of artificial intelligence technology, autonomous driving (also known as unmanned driving) has become a new development direction of various transportation means and industry of special vehicles. Positioning is one of the important technologies in the autonomous driving.

In the prior arts, a generally adopted positioning method is: matching point cloud data collected by laser radar in a vehicle in real time and a pre-constructed high-definition map to determine a position of the vehicle. High-definition map is also called HD map, which is used by the autonomous driving vehicle. The high-definition map has accurate vehicle position information and rich road element data information, which can help the vehicle to predict road complexity information, such as slope, curvature, heading, etc., thereby better avoiding potential risk.

However, when the road environment changes, relatively large difference may exist between the point cloud data and the data of the corresponding area in the high-definition map, which will cause that the determined position of the vehicle is not accurate enough, or the circumstance that the position of the vehicle cannot be determined.

SUMMARY

The present disclosure provides a vehicle positioning method, an apparatus and a vehicle for improving reliability of positioning.

According to a first aspect of the present disclosure, a vehicle positioning method is provided, the method including:

in response to that there is no high-definition map in a vehicle, acquiring intermediate pose information of the vehicle based on a global navigation satellite system and/or an inertial measurement unit in the vehicle, and determining the intermediate pose information as global positioning information, where the global positioning information includes global pose information and global attitude angle information; and acquiring local positioning information of the vehicle, where the local positioning information includes local pose information and local attitude angle information, and performing fusion processing to the global pose information and the local pose information to obtain fused pose information, and performing compensation processing to the fused pose information according to the global attitude angle information and the local attitude angle information to obtain the position of the vehicle.

According to a second aspect of the present disclosure, an electronic device is provided, including:

at least one processor; and a memory communicatively connected to the at least one processor; where the memory stores an instruction executable by the at least one processor, and the instruction is executed by the at least one processor to cause the at least one processor to perform the method according to the first aspect.

According to a third aspect of the present disclosure, a non-transitory computer-readable storage medium storing a computer instruction is provided, where the computer instruction is used to cause a computer to perform the method according to the first aspect.

According to a fourth aspect of the present disclosure, an autonomous driving vehicle is provided, including:

a global positioning apparatus, configured to acquire, in response to that there is no high-definition map in a vehicle, intermediate pose information of the vehicle based on a global navigation satellite system and/or an inertial measurement unit in the vehicle, and determine the intermediate pose information as global positioning information, where the global positioning information includes global pose information and global attitude angle information;

a local positioning apparatus, configured to acquire local positioning information of the vehicle, where the local positioning information includes local pose information and local attitude angle information; and a pose graph optimizing apparatus, configured to perform fusion processing to the global pose information and the local pose information to obtain fused pose information, and perform compensation processing to the fused pose information according to the global attitude angle information and the local attitude angle information to obtain a position of the vehicle.

It should be understood that the content described in this section is not intended to identify key or important features of the embodiments of the present disclosure, nor is it used to limit the scope of the present disclosure. Other features of the present disclosure will be readily understood from the following description.

BRIEF DESCRIPTION OF DRAWINGS

The accompanying drawings are for better understanding of the present solution, and do not constitute a limitation to the present disclosure.

DESCRIPTION OF EMBODIMENTS

The following description of illustrative embodiments of the present disclosure will be made with reference to the accompanying drawings, which include various details of the embodiments of the present disclosure to facilitate understanding, and they should be regarded as illustrative only. Therefore, those of ordinary skills in the art should realize that various changes and modifications can be made to the embodiments described herein without departing from the scope and spirit of the present disclosure. Similarly, for clarity and conciseness, descriptions of well-known functions and structures are omitted in the following description.

Autonomous driving adopts cooperation of artificial intelligence, computer vision, radar, monitoring apparatus and navigation and positioning systems, and uses machine vision technology in combination with monocular or multinocular cameras, to enable vehicles (i.e., autonomous driving vehicles) to identify traffic lights, traffic signs, lane lines, close-range and low-speed obstacles in real time, and to determine a position of the vehicle, etc., and at the same time, to communicate with road infrastructure and cloud database, so that vehicles can drive on planned routes according to traffic rules.

Positioning is one of important technologies of autonomous driving, and according to the position of the vehicle determined based on positioning, the vehicle is enabled to adjust traveling strategy automatically, such as making a turn and slowing down, etc., so as to improve reliability and accuracy for vehicle traveling.

Figure 1:
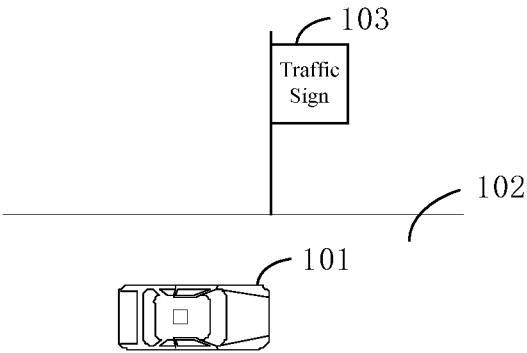
FIG. 1 is a scenario diagram for realizing a vehicle positioning method of the embodiment of the present disclosure.

Illustratively, as shown in FIG. 1, a vehicle 101 travels on a road 102, where the road 102 includes a lane line 1021, and a traffic sign 103 is set on at least one side of the road 102.

The traffic sign may be a sign of slowing down, or a sign of road type, which will not be listed one by one here.

An image-collecting apparatus is provided on the vehicle, where the image-collecting apparatus may be a camera (such as a monocular camera or a multinocular camera). Related information of lane lines (such as coordinates) and traffic signs (such as text content) can be identified based on the image-collecting apparatus, and the vehicle determines the position of the vehicle according to the positioning technology (which may also be realized with reference to images in the traveling process of the vehicle collected by the image-collecting apparatus), to control the traveling of the vehicle by combining the related information of the lane lines and the traffic signs, for example, to control the vehicle to slow down, or to make a turn, and so on.

It should be understood that the above embodiment is only for illustrative description of possible suitable application scenarios of the vehicle positioning method of the present embodiment, and should not be understood as limitations to the application scenarios.

For example, in the application scenario shown in FIG. 1, elements can be added, for example, a roadside device is set on at least one side of the road, etc., or elements can be deleted, for example, the traffic sign is deleted.

In the related arts, the positioning of a vehicle is generally realized with reference to a high-definition map. The high-definition map can be a vectorized high-definition map generated by means of automatically marking or manually marking.

For example, a high-definition map where the vehicle is currently located at is determined from the high-definition map, that is, a part of the high-definition map corresponding to a position of the vehicle is determined from the whole high-definition map, and a point cloud collected by a radar is acquired, and the position of the vehicle is obtained by matching the point cloud with the high-definition map.

For example, a high-definition map where the vehicle is currently located at is determined from the high-definition map, that is, a part of the high-definition map corresponding to a position of the vehicle is determined from the whole high-definition map, and images in a traveling process of the vehicle collected by an image-collecting apparatus (such as a monocular camera or a multinocular camera) are acquired, and the position of the vehicle is obtained by matching the images with the high-definition map.

However, the above method for positioning is highly relied on the high-definition map, therefore, on the one hand, the application scenario is seriously restricted, and the above positioning method cannot be used in scenarios without the high-definition map, thus a technical problem of lack of flexibility and generality in application exists when the above positioning method is adopted; on the other hand, making and updating of the high-definition map is generally later than the actual time of road changes, thus if the high-definition map of a road is not updated in time, a technical problem of low accuracy and reliability for positioning will be caused.

To avoid at least one of the above technical problems, inventors of the present disclosure have obtained the inventive concept of the present disclosure through creative efforts: in a positioning scenario without the high-definition map, intermediate pose information of the vehicle is acquired based on a global navigation satellite system and/or an inertial measurement unit, and the intermediate pose information is determined as global positioning information, and local positioning information is acquired, so as to determine fused pose information according to global pose information in the global positioning information and local pose information in the local positioning information, and compensation processing is performed to the fused pose information based on global attitude angle information in the global positioning information and local attitude angle information in the local positioning information to obtain the position of the vehicle.

Based on the above inventive concept, the present disclosure provides a vehicle positioning method, an apparatus and a vehicle, which apply with autonomous driving in the technical field of artificial intelligence, and can be applied in high-definition positioning of the autonomous driving vehicle, so as to improve flexibility of application adaption and reliability of positioning.

Figure 2:
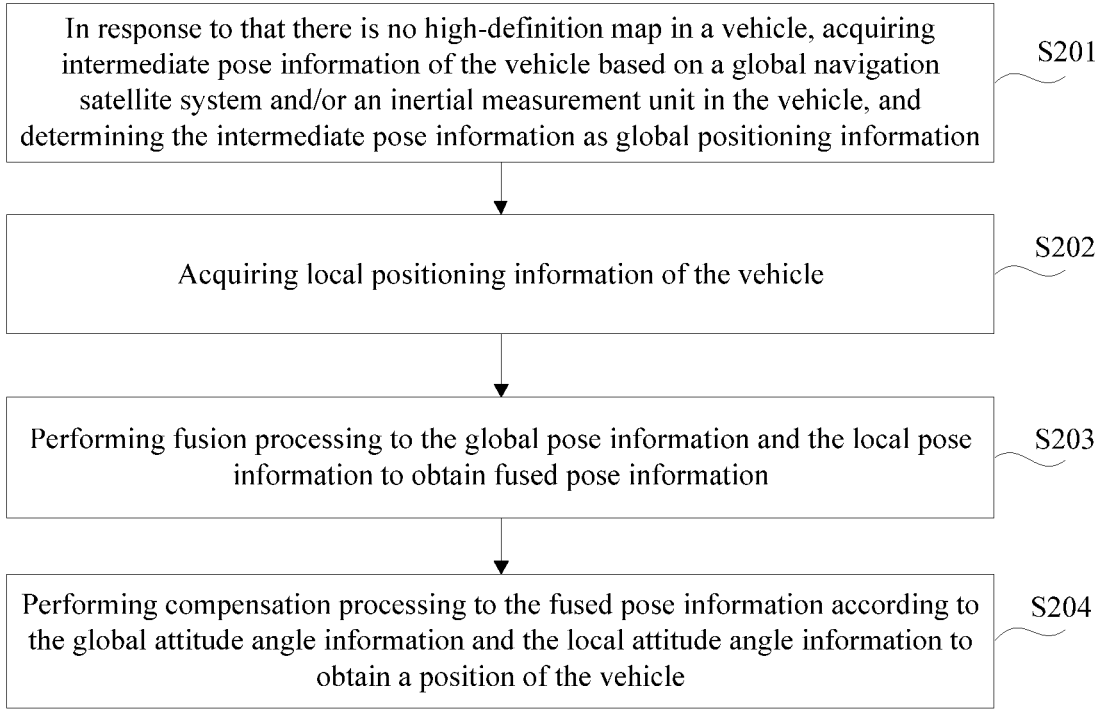
FIG. 2 is a schematic diagram according to a first embodiment of the present disclosure.

FIG. 2 is a schematic diagram according to a first embodiment of the present disclosure. As shown in FIG. 2, the vehicle positioning method includes:

S201: in response to that there is no high-definition map in a vehicle, acquiring intermediate pose information of the vehicle based on a global navigation satellite system and/or an inertial measurement unit in the vehicle, and determining the intermediate pose information as global positioning information.

S202: acquiring local positioning information of the vehicle.

The global positioning information includes global pose information and global attitude angle information, and the local positioning information includes local pose information and local attitude angle information.

Illustratively, the execution subject of the present embodiment may be a positioning apparatus of the vehicle (hereinafter referred to as positioning apparatus for short), and the positioning apparatus may be a computer, a server, a vehicle terminal, a processor, a chip, etc., provided on the vehicle, which is not limited by the present embodiment.

The positioning apparatus may also be a computer or a server (including a local server and a cloud server, and the server may be a cloud control platform, a vehicle-road coordination management platform, a center subsystem, an edge computing platform, a cloud computing platform, etc.) independent from the vehicle, or a roadside device, a terminal device, a processor, a chip, etc., which is not limited by the present embodiment.

The roadside device may be, for example, a roadside perception device with computing function, or a roadside computing device connected with the roadside perception device. In a system architecture of intelligent traffic of vehicle-road coordination, the roadside device includes the roadside perception device or the roadside computing device, the roadside perception device (such as a roadside camera) is connected to the roadside computing device (such as a roadside computing unit, RSCU), the roadside computing device is connected to a server, and the server can communicate with the autonomous driving vehicle or an assistance driving vehicle by various means; or the roadside perception device possesses computing function by itself, and the roadside perception device is directly connected to the server. The connection above may be wired or wireless, which is not limited by the present embodiment.

The global positioning information and the local positioning information are a pair of relative concepts, where the global positioning information can be understood as positioning information based on a global coordinate system, and the local positioning information can be understood as positioning information based on a local coordinate system.

For example, the global coordinate system may be the world coordinate system with longitudes and latitudes, and the local coordinate system may be a coordinate system of which an initial position of the vehicle is an origin point.

The pose information may include rotation and displacement, and then the global pose information may include global rotation and global displacement, and the local pose information may include local rotation and local displacement.

The attitude angle information may include angle-related information of the vehicle, such as one or more of a roll angle (which refers to an angle between an transverse axis of the vehicle coordinate system and the horizontal plane), a pitch angle (which refers to an angle between an longitudinal axis of the vehicle coordinate system and the horizontal plane, when the longitudinal axis of the vehicle coordinate is above the plane of the inertial coordinate system, the pitch angle is positive, otherwise the pitch angle is negative, that is, an angle between a vector parallel with the axis of the vehicle and pointing forward from the vehicle and the ground, where both the vehicle coordinate system and the inertial coordinate system adopt the right-hand coordinate system), and a yaw angle (an angle between a projection of the vehicle axis to the horizontal plane and the ground axis).

Correspondingly, the global attitude angle information includes one or more of a global roll angle, a global pitch angle and a global yaw angle, and the local attitude angle information includes one or more of a local roll angle, a local pitch angle, and a local yaw angle.

It should be noted that, in related arts, positioning of the vehicle needs to be realized with reference to the high-definition map, but in the present embodiment, when there is no high-definition map, the intermediate pose information can be acquired based on the global navigation satellite system and/or the inertial measurement unit, to determine the intermediate pose information as the global pose information, so as to avoid that the high-definition map is highly relied on in the related arts, so that the vehicle positioning method in the present embodiment can adapt to more scenarios, thereby improving flexibility and generality of the positioning.

For example, when the method of the present embodiment is applied in the application scenario as shown in FIG. 1, a global positioning apparatus and a local positioning apparatus may be provided on the vehicle shown in FIG. 1, where the global positioning apparatus is used to acquire the global positioning information, and the local positioning apparatus is used to acquire the local positioning information.

S203, performing fusion processing to the global pose information and the local pose information to obtain fused pose information.

This step may be understood as: the positioning apparatus comprehensively considers the global pose information and the local pose information, so as to determine pose information having higher accuracy and reliability (that is, the fused pose information).

The means of fusion processing is not limited by the present embodiment, for example, according to the global coordinate system and the local coordinate system, pose information after the local pose information based on the local coordinate system is transformed to the global coordinate system is determined, and the fused pose information is determined according the transformed pose information and the global pose information.

For another example, according to the global coordinate system and the local coordinate system, pose information after the global pose information based on the global coordinate system is transformed to the local coordinate system is determined, and the fused pose information is determined according to the transformed pose information and the local pose information.

In addition, in the process of fusion processing, it can be realized by adopting weighted-averaging or averaging.

It worth to be noted that, by fusing the global pose information and the local pose information, the fused pose information is caused to consider pose information of different coordinate systems, so as to improve reliability and effectiveness of the fused pose information.

S204, performing compensation processing to the fused pose information according to the global attitude angle information and the local attitude angle information to obtain a position of the vehicle.

The compensation processing can be understood as correction processing to the fused pose information. By correcting the fused pose information, reliability of the fused pose information can be further improved, so as to improve the accuracy and reliability of the position of the vehicle, thereby improving reliability when the vehicle is performing strategy adjustment based on the position of the vehicle, and ensuring safety for vehicle traveling.

For example, when the method of the present embodiment is applied in the application scenario shown in FIG. 1, a pose graph optimizing apparatus can be provided in the vehicle, and the global positioning apparatus and the local positioning apparatus are connected to the pose graph optimizing apparatus respectively.

The global positioning apparatus transmits the global positioning information to the pose graph optimizing apparatus, and the local positioning apparatus transmits the local positioning information to the pose graph optimizing apparatus, and the pose graph optimizing apparatus generates the fused pose information according to the global positioning information and the local positioning information, and outputs the position of the vehicle.

As can be seen based on the above analysis, the embodiment of the present disclosure provides a vehicle positioning method, including: in response to that there is no high-definition map in a vehicle, acquiring intermediate pose information of the vehicle based on a global navigation satellite system and/or an inertial measurement unit in the vehicle, and determining the intermediate pose information as global positioning information, wherein global positioning information includes global pose information and global attitude angle information; acquiring local positioning information of the vehicle, wherein the local positioning information includes local pose information and local attitude angle information; performing fusion processing to the global pose information and the local pose information to obtain fused pose information; performing compensation processing to the fused pose information according to the global attitude angle information and the local attitude angle information to obtain a position of the vehicle. In the present embodiment, the following distinguishing technical features are introduced: when there is no high-definition map, the intermediate pose information acquired by the global navigation satellite system and/or the inertial measurement unit is determined as the global positioning information, and fusion processing is performed to the global pose information and the local pose information to obtain the fused pose information, and compensation processing is performed to the fused pose information based on the global attitude angle information and the local attitude angle information to obtain the position of the vehicle. The method is not highly relied on the high-definition map, and can be applied to various scenarios, which improves flexibility and diversity of positioning adaption, and the position of the vehicle is determined through the mean of compensation processing, enabling the technical effect that the determined position of the vehicle has relatively high accuracy and reliability, thereby improving safety for vehicle traveling.

Figure 3:
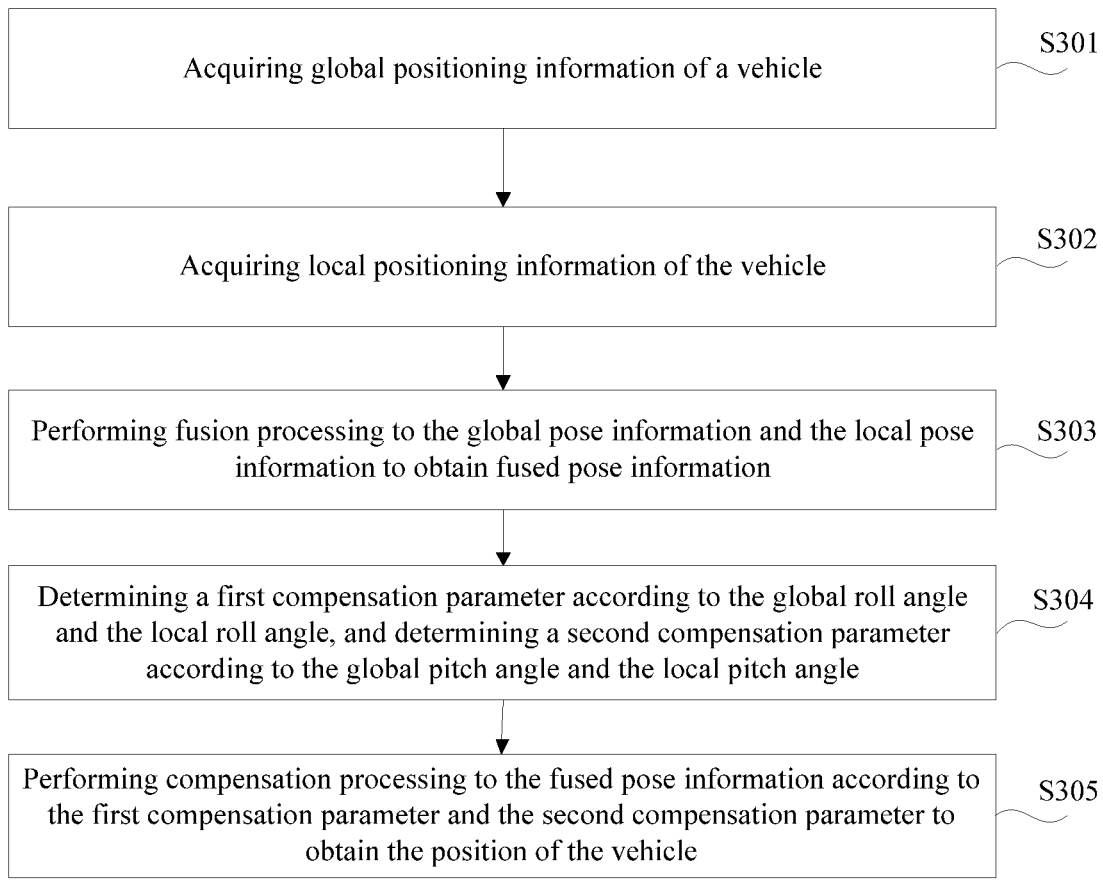
FIG. 3 is a schematic diagram according to a second embodiment of the present disclosure.

FIG. 3 is a schematic diagram according to a second embodiment of the present disclosure. As shown in FIG. 3, the vehicle positioning method includes:

S301: acquiring global positioning information of a vehicle.

In some embodiments, the realization principle of S301 can be referred to in the above embodiment.

In some other embodiments, the global positioning information can be acquired by adopting different methods according to whether there is a high-definition map included in a positioning apparatus.

Illustratively, if the positioning apparatus does not include the high-definition map, the positioning apparatus may adopt the following method to acquire the global positioning information.

In an example, the vehicle includes a global navigation satellite system, the global navigation satellite system may collect pose information (to be distinguished from other pose information, such as global pose information, and pose information collected by the global navigation satellite system can be referred to as intermediate pose information), and the positioning apparatus can determine the acquired intermediate pose information collected by the global navigation satellite system as the global positioning information.

The global navigation satellite system is also called the global navigation satellite system (GNSS), which is an air-based radio navigation positioning system which can provide three-dimensional coordinates, speed and time information of all weathers in any location of the earth surface and near-earth spaces.

In another example, the vehicle includes an inertial measurement unit, which is an apparatus that measures three-axis attitude angle (or angular rate), acceleration, etc., of the vehicle. One inertial measurement unit may include a plurality of (three for example) accelerometers and a plurality of (three for example) of gyroscopes, where the accelerometer can detect an acceleration signal of the vehicle, and the gyroscope can detect an angular velocity signal, which are analyzed to obtain the pose information of the vehicle (to be distinguished from other pose information, such as global pose information, and pose information collected by the inertial measurement unit can be referred to as intermediate pose information).

Correspondingly, the positioning apparatus can determine the acquired intermediate pose information collected by the inertial measurement unit as the global positioning information.

It should be understood that, in some other examples, the vehicle may include both the global navigation satellite system and the inertial measurement unit, and the positioning apparatus may determine the global positioning information with reference to the intermediate pose information collected by the global navigation satellite system and the inertial measurement unit respectively.

For example, the intermediate pose information collected by the global navigation satellite system may be considered as primary, and the intermediate pose information collected by the inertial measurement unit may be considered as auxiliary, and the intermediate pose information collected by the global navigation satellite system is adaptively corrected by the intermediate pose information collected by the inertial measurement unit, so as to obtain the global positioning information.

For another example, the intermediate pose information collected by the inertial measurement unit may be considered as primary, and the intermediate pose information collected by the global navigation satellite system may be considered as auxiliary, and the intermediate pose information collected by the inertial measurement unit is adaptively corrected by the intermediate pose information collected by the global navigation satellite system, so as to obtain the global positioning information.

For another example, average processing can be performed to the intermediate pose information collected by the global navigation satellite system and the intermediate pose information collected by the inertial measurement unit, so as to obtain the global positioning information.

It is worth to be noted that, in the present embodiment, the global positioning information is acquired with reference to the global navigation satellite system and/or the inertial measurement unit, and the high-definition map is not relied on, so it is avoided that the high-definition map is highly relied on in the related arts, such that the vehicle positioning method in the present embodiment can be adapted to more scenarios, thereby improving flexibility and generality of the positioning.

If the positioning apparatus includes the high-definition map, then the positioning apparatus may perform the following method to acquire the global positioning information.

The vehicle includes the global navigation satellite system and/or the inertial measurement unit, and the use of the global navigation satellite system and/or the inertial measurement unit can be referred to in the above embodiment.

The positioning apparatus acquires lane line information in the traveling process of the vehicle, and performs matching processing to the lane line information and the high-definition map, to obtain matched pose information, and acquires the intermediate pose information collected based on the global navigation satellite system and/or the inertial measurement unit, to generate the global positioning information according to the matched pose information and the intermediate pose information.

For example, the positioning apparatus may acquire the lane line information in the traveling process of the vehicle based on means of lane line detection, where lane line information may be three-dimensional coordinates of a lane line, and perform matching processing to the three-dimensional coordinates of the lane line and the high-definition map to obtain the matched pose information, where the matched pose information is used to represent rotation and displacement between the three-dimensional coordinates of the lane line obtained by lane line detection and the three-dimensional coordinates of the lane line in the high-definition map.

It is worth to be noted that, the global positioning information is generated by combining the lane line information, the high-definition map and the intermediate pose information, and since multi-aspect factors for generating the global positioning information are considered, thus the technical effect is realized that errors of the global positioning information is reduced, and the accuracy and reliability of the global positioning information is improved.

As can be seen based on the above analysis that when the positioning apparatus determines the global positioning information, it can be realized with reference to the high-definition map preferentially, so as to improve the accuracy of the determined global positioning information. In scenarios where there is no high-definition map, or the high-definition map is not updated in time, it can be realized based on the global navigation satellite system and/or the inertial measurement unit, so as to avoid that the high-definition map is highly relied on.

S302: acquiring local positioning information of the vehicle.

In some embodiments, the realization principle of S302 can be referred to in the above embodiment.

In some other embodiments, the vehicle includes an image-collecting apparatus, and the local pose information is visual odometer information determined based on the images in the traveling process of the vehicle collected by the image-collecting apparatus.

The visual odometer information includes odometer relative pose information (which may include standard deviation), and may also include odometer attitude angle information (referring to description of the attitude angle information in the above embodiment).

It is worth to be noted that the visual odometer information can be determined by the image-collecting apparatus, and the visual odometer information can also be determined by the image-collecting apparatus in combination with other components, such as the inertial measurement unit, etc., and the specific principle for determining the visual odometer information can be realized by adopting related arts, which will not be repeated here.

In the present embodiment, the acquisition of the visual odometer information does not rely on the high-definition map, thus it is avoided that the high-definition map is highly relied on in the related arts, such that the vehicle positioning method in the present embodiment can be adapted to more scenarios, thereby improving flexibility and generality of the positioning.

S303, performing fusion processing to the global pose information and the local pose information to obtain fused pose information.

The global positioning information includes global pose information and global attitude angle information, and the local positioning information includes local pose information and local attitude angle information.

In some embodiments, the realization principle of S303 can be referred to in the above embodiment, which will not be repeated here.

In some other embodiments, the global pose information includes previous-frame global pose information and current-frame global pose information, and a previous frame and a current frame are two adjacent frames in images in a traveling process of the vehicle, and S303 may include the following steps:

first step: determining a first inter-frame relative pose of the vehicle between two adjacent frames according to the previous-frame global pose information and the current-frame global pose information.

The first inter-frame relative pose can be understood as pose information during a process when the vehicle travels from the previous-frame global pose information to the current-frame global pose information.

In some embodiments, the first inter-frame relative pose $z_{\{k-1,k\}}^{G}$ can be determined based on equation 1:

$$z_{\{k-1,k\}}^{G} = z_{k-1}^{G^{-1}} \cdot z_k^{G} = [R_{\{k-1,k\}}^{G}, t_{\{k-1,k\}}^{G}]$$

where k−1 is the previous frame, k is the current frame, G is global, R is rotation, t is displacement.

Second step: determining a global confidence degree of the global pose information according to the first inter-frame relative pose and the local pose information.

The global confidence degree is used to represent reliability degree of the global pose information. Comparatively, the higher the global confidence degree is, the higher the reliability degree of the global pose information is, and the higher the reliability degree of the position of the vehicle determined based on the global pose information is; on the contrary, the lower the global confidence degree is, the lower the reliability degree of the global pose information is, and the lower the reliability degree of the position of the vehicle determined based on the global pose information is.

As can be seen with reference to the above analysis that the global pose information can be determined based on the global navigation satellite system and/or the inertial measurement unit, and if the determined global confidence degree is relatively high, it is represented that the global pose information determined based on the global navigation satellite system and/or the inertial measurement unit has relatively high adaptability, or it is represented that the global navigation satellite system and/or the inertial measurement unit can operate normally.

In some embodiments, the second step may include the following sub-steps:

first sub-step: determining a second inter-frame relative pose according to the first inter-frame relative pose and the local pose information.

The second inter-frame relative pose is used to represent a discrepancy between the global pose information and the local pose information.

In some embodiments, the first sub-step may include the following specific steps:

first specific step: determining a third inter-frame relative pose of the vehicle between two adjacent frames according to the previous-frame local pose information and the current-frame local pose information.

Similarly, in some embodiments, the third inter-frame relative pose $z_{\{k-1,k\}}^L$ can be determined based on equation 2:

$$z_{\{k-1,k\}}^L = [R_{\{k-1,k\}}^L, t_{\{k-1,k\}}^L]$$

where L is local.

Second specific step: determining a discrepant pose between the first inter-frame relative pose and the third inter-frame relative pose, and determining the discrepant pose as the second inter-frame relative pose.

In some embodiments, the second inter-frame relative pose=$\|z_{\{k-1,k\}}^G - z_{\{k-1,k\}}^L\|$.

It is worth to be noted that, in the present embodiment, the second inter-frame relative pose is determined by combining the change of the local pose information between the two adjacent frames of the vehicle and the first inter-frame relative pose, which makes the second inter-frame relative pose fit with the actual operation state of the vehicle, thereby realizing the technical effect that the second inter-frame relative pose has high reliability and accuracy.

Second sub-step: determining the global confidence degree according to the second inter-frame relative pose.

In the present embodiment, the global confidence degree is determined based on the discrepancy between the global pose information and the local pose information, so that determination of the global confidence degree is highly related to the discrepancy between global and local traveling state of the vehicle, thereby realizing the technical effect of making the global confidence degree have high accuracy and reliability.

Third step: if the global confidence degree reaches a preset global confidence degree threshold, performing fusion processing to the global pose information and the local pose information to obtain the fused pose information.

The positioning apparatus can set the global confidence degree threshold based on means of requirements, historical records, tests, etc., which is not limited by the present embodiment.

For example, for positioning scenarios with relatively high accuracy requirement, the global confidence degree threshold may be set as a relatively large value, and on the contrary, for positioning scenarios with relatively low accuracy requirement, the global confidence degree threshold may be set as a relatively small value.

With reference to the above analysis, with reference to equation 2, it can be determined that the global confidence degree reaches the global confidence degree threshold according to equation 3:

$$\|z_{\{k-1,k\}}^G - z_{\{k-1,k\}}^L\| \leq f(v_k) + \varphi$$

where $v_k$ is a current velocity of the vehicle, $\varphi$ is a preset constant (similarly, it can be set by the positioning apparatus based on means of requirements, historical records, tests, etc., which is not limited by the present embodiment).

If the above equation 3 holds, the global confidence degree reaches (that is, greater than or equal to) the global confidence degree threshold, and on the contrary, if the above equation 3 does not hold, the global confidence degree does not reach (that is, smaller than) the global confidence degree threshold.

This step can be understood as: the positioning apparatus determines whether the global confidence degree is greater or smaller than the global confidence degree threshold, and if the global confidence degree is greater than or equal to the global confidence degree threshold, it is represented that the reliability degree of the global pose information is high, that is, the global pose information is acquired under the circumstance that the global navigation satellite system and/or the inertial measurement unit operate normally, then fusion processing is performed to the global pose information and the local pose information to obtain the fused pose information.

It is worth to be noted that, in the present embodiment, when the global confidence degree reaches the global confidence degree threshold, the global pose information has high reliability, and the global pose information with high reliability and the local pose information are fused, to generate the fused pose information, which makes the fused pose information have high reliability, so as to satisfy the technical effect of determining the position of the vehicle with high accuracy based on the fused pose information.

In some embodiments, the third step may include: if the global confidence degree reaches the preset global confidence degree threshold, acquiring a local confidence degree corresponding to the local pose information, and if the local confidence degree reaches the preset local confidence degree threshold, performing fusion processing to the global pose information and the local pose information to obtain the fused pose information.

Similarly, the local confidence degree is used to represent reliability degree of the local pose information. Comparatively, the higher the local confidence degree is, the higher the reliability degree of the local pose information is, and the higher the reliability of the position of the vehicle determined based on the local pose information is; on the contrary, the lower the local confidence degree is, the lower the reliability degree of the local pose information is, and the lower the reliability of the position of the vehicle determined based on the local pose information is.

The principle for setting the local confidence degree threshold can be referred to the principle for setting the global confidence degree threshold mentioned above, which will not be repeated here.

In the present embodiment, after determining that the global confidence degree reaches the global confidence degree threshold, the positioning apparatus further acquires the local confidence degree to determine whether the local confidence degree is greater or smaller than the local confidence degree threshold, and if the local confidence degree is greater than or equal to the local confidence degree threshold, the fused pose information is generated according to the global pose information and the local pose information.

As can be seen with reference to the above analysis that the local pose information can be determined by an apparatus constructed based on the image-collecting apparatus and the inertial measurement unit (the apparatus may also be referred to as local visual odometer apparatus). Correspondingly, if the local confidence degree reaches the local confidence degree threshold, it is represented that the local visual odometer apparatus has high adaptability, or it is represented that the local visual odometer apparatus can operate normally.

Similarly, in the present embodiment, when the local confidence degree reaches the local confidence degree threshold, the local pose information has high reliability, and the global pose information with high reliability and the local pose information with high reliability are fused, to generate the fused pose information, which further makes the fused pose information have high reliability, so as to further satisfy the technical effect of determining the position of the vehicle with high accuracy based on the fused pose information.

In some other embodiments, if the positioning apparatus determines that the acquired global confidence degree is smaller than the global confidence degree threshold, that is, the global navigation satellite system and/or the inertial measurement unit may not operate normally, then the local pose information may be determined as the fused pose information, to realize the technical effect that the position of the vehicle can still be determined according to the local pose information under the circumstance that the reliability of the global pose information is not high or is abnormal, so as to avoid the disadvantage that the vehicle cannot be positioned, thereby improving flexibility and diversity of the positioning.

After the global navigation satellite system and/or the inertial measurement unit operate normally, the positioning apparatus determines the fused pose information by combining the global pose information and the local pose information.

In some other embodiments, if the positioning apparatus determines and obtains that global confidence degree is smaller than the global confidence degree threshold, that is, the global navigation satellite system and/or the inertial measurement unit may not operate normally, then the local confidence degree corresponding to the local pose information can be acquired, and if the local confidence degree reaches the preset local confidence degree threshold, the local pose information may be determined as the fused pose information.

In the present embodiment, on the basis of the embodiment that the local pose information is directly determined as the fused pose information when the global confidence degree is smaller than the global confidence degree threshold as mentioned above, the local pose information is determined as the fused pose information further with reference to the relationship between the local confidence degree and the local confidence degree threshold, which realizes the technical effect of making the fused pose information have high reliability, so as to make the accuracy of the positioning satisfy the positioning requirement to the best, and ensuring the safety for vehicle traveling.

In some other embodiments, if the global confidence degree reaches the global confidence degree threshold, and the local confidence degree does not reach the local confidence degree threshold, then the global pose information may be determined as the fused pose information, and after the visual odometer apparatus operates normally, the fused pose information is determined by combining the global pose information and the local pose information.

In some other embodiments, if the global confidence degree is smaller than the global confidence degree threshold, and the local confidence degree is smaller than the local confidence degree threshold, then the positioning apparatus may output a notification message to notify that the positioning is abnormal, so as to prompt the driver or other passengers to check the vehicle, or perform other corresponding processing, to avoid disadvantages of vehicle safety accident caused by the unavailable positioning, etc., thereby improving safety for vehicle traveling.

As can be seen based on the above analysis, in the present embodiment, the fused pose information may be determined by the following four means:

first: in scenarios that both the global pose information and the local pose information have high reliability, the fused pose information may be determined based on the global pose information and the local pose information;

second: in scenarios that the global pose information has high reliability but the local pose information has low reliability, the global pose information may be determined as the fused pose information;

third: in scenarios that the global pose information has low reliability but the local pose information has high reliability, the local pose information may be determined as the fused pose information;

fourth: in scenarios that the global pose information has low reliability and the local pose information has low reliability, the notification message of abnormal positioning can be issued.

It is worth to be noted that, the vehicle is positioned by combining the above four means, so the flexibility and diversity for positioning the vehicle can be realized, and smooth switch among the above four means of determining the fused pose information can also be realized, so as to realize smoothly switching for positioning the vehicle, so as to realize the technical effect of integrity and completeness of the positioning process, and diversity and flexibility of the positioning method, thereby improving accuracy and reliability of the vehicle positioning, and ensuring the safety for vehicle traveling.

In some embodiments, performing the fusion processing to the global pose information and the local pose information can be understood as a process of Maximum-A-Posteriori estimate.

For example, the fused pose information can be determined according to equation 4:

$$P(X \mid Z) \propto \prod_k P(z_k^L \mid x_k^L, x_{k-1}^L) \prod_k P(z_k^G \mid x_k^L, x_L^G)$$

where $P(X|Z)$ is a value of the Maximum-A-Posteriori estimate, $P(z_k^L|x_k^L,x_{k-1}^L)$ is a likelihood value of the local pose information, which is used to represent a conditional probability of the local pose information under a given state of $x_k^L, x_{k-1}^L$, $P(z_k^G|x_k^L,x_L^G)$ is a likelihood value of the global pose information, which is used to represent a conditional probability of the global pose information under a given state of $x_k^L, x_L^G$.

The $x_k^L, x_L^G$ satisfying the maximum of $P(X|Z)$ is determined as the fused pose information.

$z_k^L$ is a local input, $x_k^L$ is the local pose information of the current frame (that is, k-th frame), $x_{k-1}^L$ is the local pose information of the previous frame (that is, k−1-th frame), $z_k^G$ is a global input, $x_L^G$ is a transformation state variable when the global pose information is transformed from the global coordinate system to the local coordinate system where the local pose information is located at.

In some embodiments, $$P(z_k^L \mid x_k^L, x_{k-1}^L) \propto \exp\left(\frac{1}{2}\|r_k^L\|^2\right),$$

where $r_k^L$ is local pose information acquired based on the visual odometer apparatus.

$$P(z_k^G \mid x_k^L, x_L^G) \propto \exp\left(\frac{1}{2}\|r_k^G\|^2\right),$$

where $r_k^G$ is the global pose information acquired based on the global navigation satellite system and/or the inertial measurement unit.

In some embodiments, $x_k^L=[R_k^L,t_k^L]$, $x_L^G=[R_L^G,t_L^G]$, $z_k^G=[R_k^G,t_k^G]$, $(r_k^G)^T=[\text{Log}^T(R_{rG}), t_{rG}^T]$, and $(r_k^G)^T$ can be represented by equation 5:

$$\begin{bmatrix} R_{rG} & t_{rG} \\ 0 & 1 \end{bmatrix} = \begin{bmatrix} R_k^G & t_k^G \\ 0 & 1 \end{bmatrix}^{-1} \begin{bmatrix} R_L^G & t_L^G \\ 0 & 1 \end{bmatrix} \begin{bmatrix} R_k^L & t_k^L \\ 0 & 1 \end{bmatrix}.$$

In some embodiments, $(r_k^L)^T$ can be represented by equation 6:

$$(r_k^L)^T=[\text{Log}^T(R_{rL}),t_{rL}^T].$$

When equation 6 is being solved, a method of A-Posteriori estimation can be adopted. A quadratic sum of the local pose information is determined according to a negative logarithm, to generate a non-linear least square problem, and a final result is determined by using an iteration algorithm, and the specific computing process can be referred to in related arts, which will not be repeated here.

In some embodiments, when the vehicle is traveling, in each time of vehicle positioning, initialization processing can be performed to the local pose information of the vehicle based on equation 7 to obtain the initialized local pose information $\tilde{x}_{k-1}^L$ of the vehicle, where the equation 7 is:

$$\tilde{x}_{k-1}^L = x_{k-1}^L \cdot z_{\{k-1,k\}}^L.$$

S304: determining a first compensation parameter according to the global roll angle and the local roll angle, and determining a second compensation parameter according to the global pitch angle and the local pitch angle.

For example, the first compensation parameter can be determined according to a difference between the global roll angle and the local roll angle, and the second compensation parameter can be determined according to a difference between the global pitch angle and the local pitch angle.

S305: performing compensation processing to the fused pose information according to the first compensation parameter and the second compensation parameter to obtain the position of the vehicle.

It is worth to be noted that, in the present embodiment, the fused pose information is compensated by combining the first compensation parameter and the second compensation parameter, which is equal to that constraints on the roll angle and the pitch angle of the vehicle is realized, and the "slow floating" on the roll angle and the pitch angle of the vehicle from the vehicle is avoided, thereby realizing the technical effect of improving the accuracy of the determined position of the vehicle.

As can be seen from the above analysis, in some embodiments, the global attitude angle information may further include the global yaw angle, and the local attitude angle information may further include the local yaw angle, then on the basis that the first compensation parameter is determined, a third compensation parameter can further be determined based on the global yaw angle and the local yaw angle, and compensation processing is performed to the fused pose information with reference to the third compensation parameter.

For example, the compensation processing can be performed to the fused pose information by combining the first compensation parameter and the third compensation parameter, and the compensation processing can also be performed to the fused pose information by combining the second compensation parameter and the third compensation parameter, and the compensation processing can also be performed to the fused pose information by combining the first compensation parameter, the second compensation parameter and the third compensation parameter, so as to realized the technical effect of improving the flexibility and diversity of the compensation processing.

Figure 4:
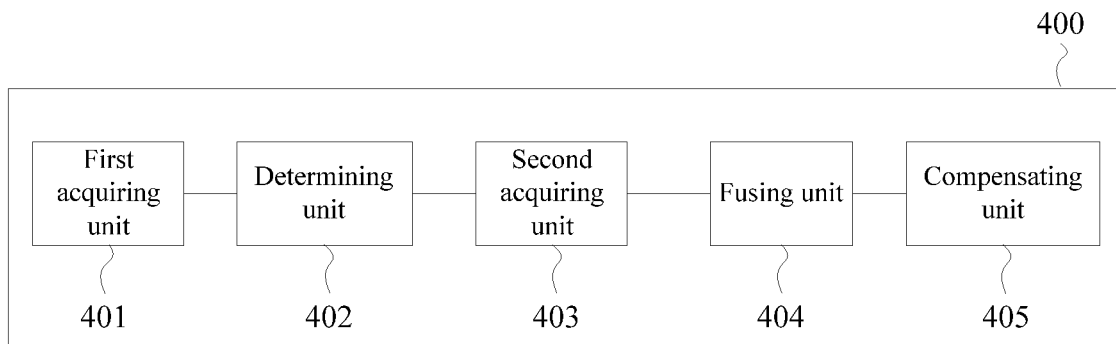
FIG. 4 is a schematic diagram according to a third embodiment of the present disclosure.

FIG. 4 is a schematic diagram according to a third embodiment of the present disclosure. As shown in FIG. 4, the vehicle positioning apparatus 400 includes:

a first acquiring unit 401, configured to acquire, in response to that there is no high-definition map in a vehicle, intermediate pose information of the vehicle based on a global navigation satellite system and/or an inertial measurement unit in the vehicle;

a determining unit 402, configured to determine the intermediate pose information as global positioning information, where the global positioning information includes global pose information and global attitude angle information;

a second acquiring unit 403, configured to acquire local positioning information of the vehicle, where the local positioning information includes local pose information and local attitude angle information;

a fusing unit 404, configured to perform fusion processing to the global pose information and the local pose information to obtain fused pose information; and a compensating unit 405, configured to perform compensation processing to the fused pose information according to the global attitude angle information and the local attitude angle information to obtain a position of the vehicle.

Figure 5:
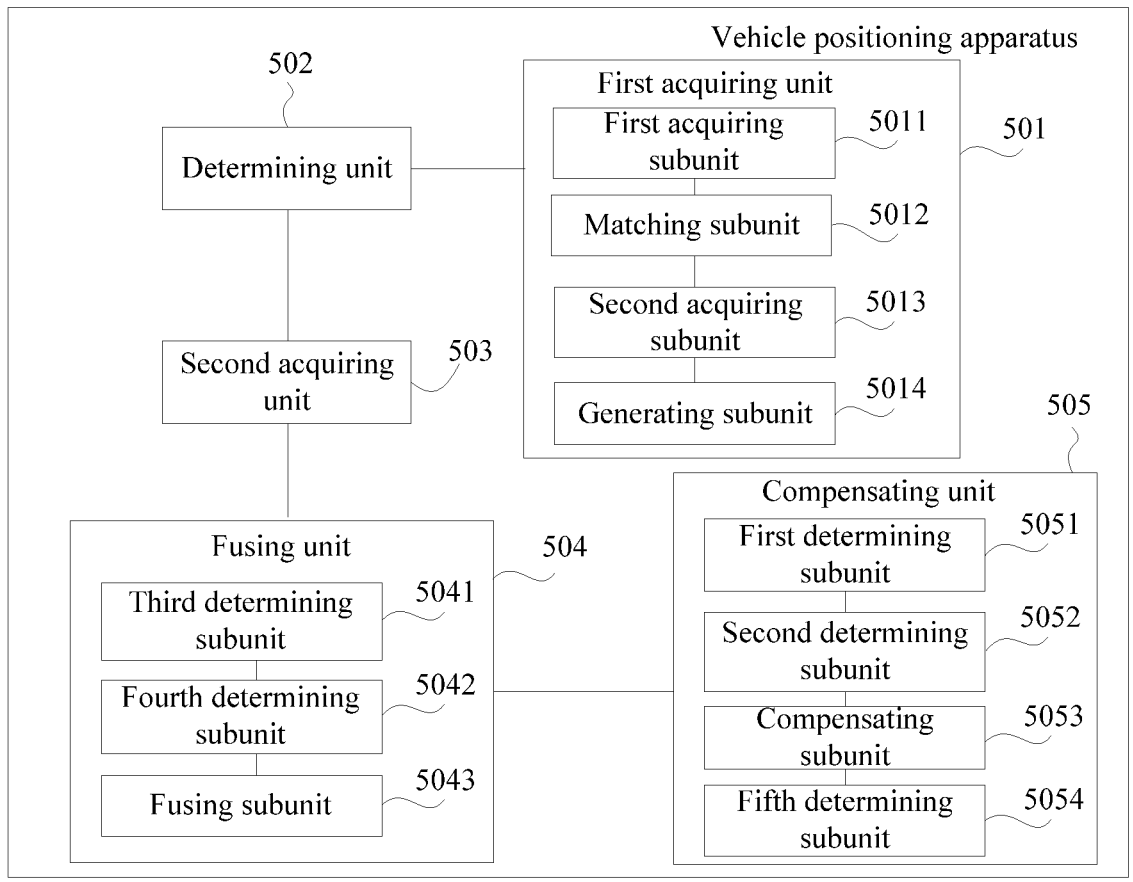
FIG. 5 is a schematic diagram according to a fourth embodiment of the present disclosure.

FIG. 5 is a schematic diagram according to a fourth embodiment of the present disclosure. As shown in FIG. 5, the vehicle positioning apparatus 500 includes:

a first acquiring unit 501, configured to acquire, in response to that there is no high-definition map in a vehicle, intermediate pose information of the vehicle based on a global navigation satellite system and/or an inertial measurement unit in the vehicle;

a determining unit 502, configured to determine the intermediate pose information as global positioning information, where the global positioning information includes global pose information and global attitude angle information; and a second acquiring unit 503, configured to acquire local positioning information of the vehicle, where the local positioning information includes local pose information and local attitude angle information.

In some embodiments, the vehicle includes a global navigation satellite system and/or an inertial measurement unit, and if the vehicle stores a high-definition map, the first acquiring unit 501 includes:

a first acquiring subunit 5011, configured to acquire lane line information in the traveling process of the vehicle;

a matching subunit 5012, configured to perform match processing to the lane line information and the high-definition map to obtain matched pose information;

a second acquiring subunit 5013, configured to acquire the intermediate pose information collected based on the global navigation satellite system and/or the inertial measurement unit;

a generating subunit 5014, configured to generate global positioning information according to the matched pose information and the intermediate pose information.

In some embodiments, the vehicle includes an image-collecting apparatus, and the local pose information is visual odometer information determined based on the images in the traveling process of the vehicle collected by the image-collecting apparatus.

In some embodiments, the global attitude angle information includes a global roll angle and a global pitch angle, and the local attitude angle information includes a local roll angle and a local pitch angle.

A fusing unit 504, configured to perform fusion processing to the global pose information and the local pose information to obtain fused pose information.

As can be seen with reference to FIG. 5, in some embodiments, the global pose information includes previous-frame global pose information and current-frame global pose information, and a previous frame and a current frame are two adjacent frames in images in a traveling process of the vehicle; the fusing unit 504 includes:

a third determining subunit 5041, configured to determine a first inter-frame relative pose of the vehicle between two adjacent frames according to the previous-frame global pose information and the current-frame global pose information;

a fourth determining subunit 5042, configured to determine a global confidence degree of the global pose information according to the first inter-frame relative pose and the local pose information.

In some embodiments, the fourth determining subunit 5042 includes:

a first determining module, configured to determine a second inter-frame relative pose according to the first inter-frame relative pose and the local pose information, where the second inter-frame relative pose is used to represent a discrepancy between the global pose information and the local pose information.

In some embodiments, the local pose information includes a previous-frame local pose information and a current-frame local pose information; the first determining module includes:

a first determining submodule, configured to determine a third inter-frame relative pose of the vehicle between two adjacent frames according to the previous-frame local pose information and the current-frame local pose information;

a second determining submodule, configured to determine a discrepant pose between the first inter-frame relative pose and the third inter-frame relative pose, and determine the discrepant pose as the second inter-frame relative pose.

A second determining module, configured to determine the global confidence degree according to the second inter-frame relative pose.

A fusing subunit 5043, configured to perform, if the global confidence degree reaches a preset global confidence degree threshold, fusion processing to the global pose information and the local pose information to obtain the fused pose information.

In some embodiments, if the global confidence degree reaches a preset global confidence degree threshold, the fusing subunit 5043 includes:

an acquiring module, configured to acquire, if the global confidence degree reaches the preset global confidence degree threshold, a local confidence degree corresponding to the local pose information;

a fusing subunit, configured to perform, if the local confidence degree reaches a preset local confidence degree threshold, fusion processing to the global pose information and the local pose information to obtain the fused pose information.

A compensating unit 505, configured to perform compensation processing to the fused pose information according to the global attitude angle information and the local attitude angle information to obtain a position of the vehicle.

As can be seen with reference to FIG. 5, in some embodiments, the compensating unit 505 includes:

a first determining subunit 5051, configured to determine a first compensation parameter according to the global roll angle and the local roll angle;

a second determining subunit 5052, configured to determine a second compensation parameter according to the global pitch angle and the local pitch angle;

a compensating subunit 5053, configured to perform compensation processing to the fused pose information according to the first compensation parameter and the second compensation parameter to obtain the position of the vehicle;

a fifth determining subunit 5054, configured to determine, if the global confidence degree is smaller than the global confidence degree threshold, the position of the vehicle according to the local pose information.

According to the embodiment of the present disclosure, the present disclosure further provides an electronic device, a readable storage medium and a computer program product.

According to the embodiment of the present disclosure, the present disclosure further provides a computer program product, including: a computer program stored in a readable storage medium, and at least one processor of an electronic device may read the computer program from the readable storage medium, and the at least one processor executes the computer program to cause the electronic device to perform the method according to any one of the above embodiment.

Figure 6:
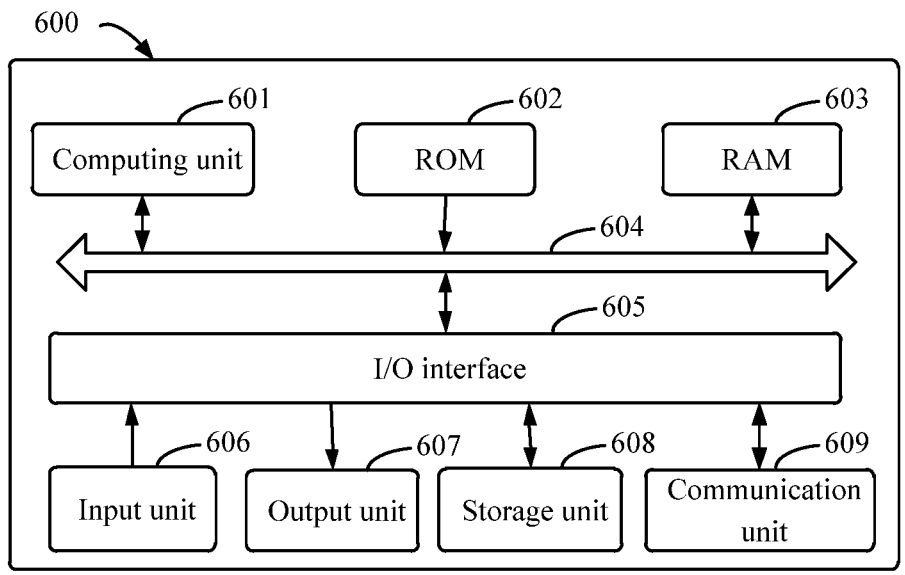
FIG. 6 is a block diagram of an electronic device for realizing a vehicle positioning method of the embodiment of the present disclosure.

FIG. 6 shows a schematic block diagram of an exemplary electronic device 600 used to implement the embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital assistant, cellular phones, smart phones, wearable devices and other similar computing devices. The components, their connections and relationships, and their functions shown herein are only taken as examples, and do not intended to limit the implementation of the present disclosure described and/or claimed herein.

As shown in FIG. 6, the device 600 includes a computing unit 601, which can perform various suitable actions and processing according to a computer program stored in a read-only memory (ROM) 602 or a computer program loaded to a random access memory (RAM) 603 from a storage unit 608. The RAM 603 can also store various programs and data required by the device 600 for operating. The computing unit 601, the ROM 602 and the RAM 603 are mutually connected through a bus 604. An input/output (I/O) interface 605 is also connected to the bus 604.

A plurality of components in the device 600 are connected to the I/O interface 605, including: an input unit 606, such as a keyboard, a mouse, etc.; an output unit 607, such as various types of displays, speakers, etc.; the storage unit 608, such as a magnetic disk, an optical disk, etc.; and a communication unit 609, such as a network card, a modem, a wireless communication transceiver, etc. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units running machine learning model algorithms, digital signal processors (DSP), and any suitable processor, controller, micro controller, etc. The computing device 601 performs respective methods and processing described above, for example, the vehicle positioning method. For example, in some embodiments, the vehicle positioning method can be implemented as a computer software program tangibly contained in a machine-readable medium, such as the storage unit 608. In some embodiments, part or all of the computer programs can be loaded and/or installed on the device 600 via the ROM 602 and/or the communication unit 609. When the computer program is loaded on the RAM 603 and is executed by the computing unit 601, one or more steps of the above-described vehicle positioning method can be performed. Alternatively, in other embodiments, the computing unit 601 can be configured to perform the vehicle positioning method by any other suitable means (for example, by means of firmware).

Various embodiments of the systems and technologies described above can be implemented in digital electronic circuit system, integrated circuit system, field programmable gate array (FPGA), application specific integrated circuit (ASIC), application specific standard product (ASSP), system on chip (SOC), load programmable logic device (CPLD), computer hardware, firmware, software, and/or the combination thereof. These various embodiments may include: being implemented in one or more computer programs that can be executed and/or interpreted on a programmable system including at least one programmable processor, which can be a dedicated or universal programmable processor that can receive data and instructions from a storage system, at least one input apparatus, and at least one output apparatus, and transmit the data and instructions to the storage system, the at least one input apparatus, and the at least one output apparatus.

The program code for implementing the method of the present disclosure can be written in any combination of one or more programming languages. These program codes can be provided to a processor or controller of a general-purpose computer, a special-purpose computer or other programmable data processing apparatuses, so that the program codes, when executed by the processor or controller, cause the functions/operations specified in the flowchart and/or block diagrams to be implemented. The program codes can be completely executed on a machine, partially executed on the machine, partially executed on the machine as an independent software package and partially executed on a remote machine or completely executed on the remote machine or server.

In the context of the present disclosure, the machine-readable medium can be a tangible medium that may contain or store a program for use by or in connection with an instruction execution system, apparatus or device. The machine-readable medium can be a machine-readable signal medium or a machine-readable storage medium. The machine-readable medium may include, but is not limited to, electronic, magnetic, optical, electromagnetic, infrared, or semiconductor systems, apparatuses or devices, or any suitable combination thereof. More specific examples of machine-readable storage medium may include electrical connections based on one or more wires, portable computer disks, hard disks, random access memories (RAM), read-only memories (ROM), erasable programmable read-only memories (EPROM or flash memories), optical fibers, compact disk read-only memories (CD-ROMs), optical storage devices, magnetic storage devices, or any suitable combination thereof.

To provide interaction with users, the systems and technologies described herein can be implemented on a computer, the computer including: a display apparatus (for example, CRT (cathode ray tube) or LCD (liquid crystal display) monitor) for displaying information to users; and a keyboard and a pointing apparatus (for example, a mouse or a trackball) through which a user can provide input to the computer. Other kinds of apparatuses can also be used to provide interaction with users; for example, a feedback provided to the user can be any form of sensory feedbacks (for example, visual feedback, auditory feedback, or tactile feedback); and the apparatuses can receive the input from the user in any form (including acoustic input, voice input or tactile input).

The systems and technologies described herein can be implemented in a computing system including a back-end component (e.g., as a data server), or a computing system including a middleware component (e.g., an application server), or a computing system including a front-end component (e.g., a user computer with a graphical user interface or a web browser through which users can interact with the embodiments of the systems and technologies described herein), or a computing system including any combination of such back-end components, middleware components, or front-end components. The components of the system can be connected to each other by any form or medium of digital data communication (for example, communication network). Examples of communication networks include local area network (LAN), wide area network (WAN) and the Internet.

A computer system may include a client and a server. The client and the server are generally far away from each other and usually interact through a communication network. The relationship between the client and the server is generated by computer programs running on corresponding computers and having a client-server relationship with each other. The server can be a cloud server, also known as a cloud computing server or a cloud host, which is a host product in the cloud computing service system, in order to solve the defects of the traditional physical host and VPS service ("Virtual Private Server", or "VPS" for short), which are difficult to manage and weak in business scalability. The server can also be a distributed system server or a server combined with block chain.

Figure 7:
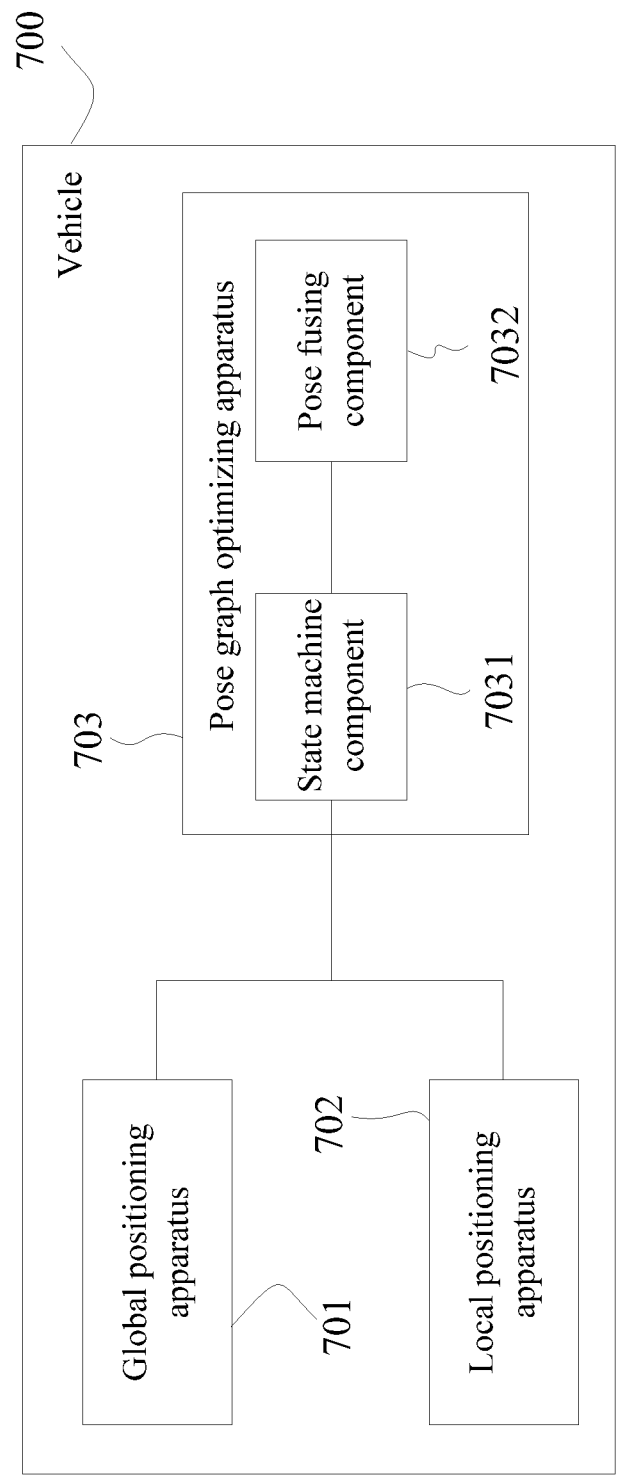
FIG. 7 is a schematic diagram according to a fifth embodiment of the present disclosure.

FIG. 7 is a schematic diagram according to a fifth embodiment of the present disclosure. As shown in FIG. 7, the vehicle 700 includes:

a global positioning apparatus 701, configured to acquire global positioning information of a vehicle, where the global positioning information includes global pose information and global attitude angle information.

In some embodiments, the global positioning apparatus 701 includes: a global navigation satellite system and/or an inertial measurement unit.

The principle of acquiring the global positioning information by the global navigation satellite system and/or the inertial measurement unit can be referred to the above embodiments, which will not be repeated here.

A local positioning apparatus 702, configured to acquire local positioning information of the vehicle, where the local positioning information includes local pose information and local attitude angle information.

In some embodiments, the local positioning apparatus 702 includes a visual odometer apparatus, and the visual odometer apparatus can be constructed based on an image-collecting apparatus, the global navigation satellite system and the inertial measurement unit. The principle of acquiring the local positioning information by the visual odometer apparatus can be referred to the above embodiments, which will not be repeated here.

A pose graph optimizing apparatus 703, configured to perform fusion processing to the global pose information and the local pose information to obtain fused pose information, and perform compensation processing to the fused pose information according to the global attitude angle information and the local attitude angle information to obtain a position of the vehicle.

In some embodiments, as shown in FIG. 7, the pose graph optimizing apparatus 703 may include:

a state machine component 7031, configured to determine a global state attribute of the global positioning apparatus 701, the local state attribute of the local positioning apparatus 702, and determine the fused pose information according to the global state attribute and the local state attribute.

A state attribute includes a normal state and an abnormal state, and correspondingly, the global state attribute includes a global normal state and a global abnormal state, and the local state attribute includes a local normal state and a local abnormal state.

With reference to the analysis above, if the global state attribute of the global positioning apparatus 701 is the global normal state, it is represented that the global positioning apparatus 701 operates normally and can provide relatively reliable global positioning information, and on the contrary, if the global state attribute of the global positioning apparatus 701 is the global abnormal state, it is represented that the global positioning apparatus 701 operates abnormally, and cannot provide relative reliable global positioning information.

Similarly, if the local state attribute of the local positioning apparatus 702 is the local normal state, it is represented that the local positioning apparatus 702 operates normally and can provide relatively reliable local positioning information, and on the contrary, if the local state attribute of the local positioning apparatus 702 is the local abnormal state, it is represented that the local positioning apparatus 702 operates abnormally, and cannot provide relative reliable local positioning information.

A pose fusing component 7032, configured to fuse the global pose information and/or the local pose information to obtain the fused pose information.

With reference to the above analysis, for example, if the global state attribute of the global positioning apparatus 701 is the global normal state, and the local state attribute of the local positioning apparatus 702 is the local normal state, then the pose fusing component 7032 fuses the global pose information and the local pose information to obtain the fused pose information.

Figure 8:
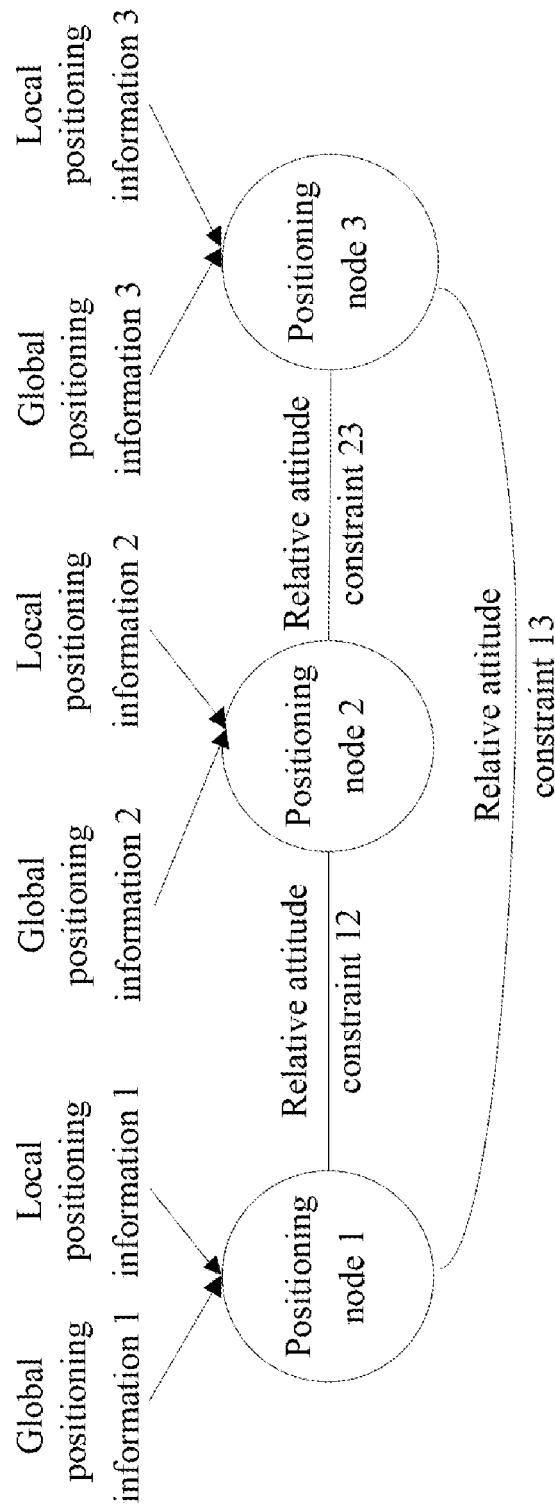
FIG. 8 is a first principle schematic diagram for determining fused pose information according to the present disclosure.

Illustratively, each positioning to the vehicle can be referred to as a positioning node, as shown in FIG. 8, three positioning nodes is illustratively represented, which are denoted as positioning node 1, positioning node 2 and positioning node 3 respectively.

As shown in FIG. 8, the positioning node 1 is an initial positioning node, and at the positioning node 1, the position of the vehicle at the positioning node 1 can be determined based on the global positioning information 1 and the local positioning information 1 at the positioning node 1.

As can be seen with reference to FIG. 8 and equation 6, at positioning node 2, a relative attitude constraint 12 between the positioning node 1 and the positioning node 2 is established based on the local positioning information 1 and the local positioning information 2, and the position of the vehicle at the positioning node 2 is determined based on the relative attitude constraint 12, the global positioning information 2 and the local positioning information 2 at the positioning node 2.

In some embodiments, as shown in FIG. 8, at the positioning node 3, a relative attitude constraint 23 between the positioning node 2 and the positioning node 3 is established based on the local positioning information 2 and the local positioning information 3, and a relative attitude constraint 13 between the positioning node 1 and the positioning node 3 is established based on the local positioning information 1 and the local positioning information 3, and the position of the vehicle at the positioning node 3 is determined based on the relative attitude constraint 23, the relative attitude constraint 13, the global positioning information 3 and the local positioning information 3 at the positioning node 3.

It should be understood that, the implementation principle with more positioning nodes is the same with the above implementation principle, which will not be listed here one by one.

For another example, if the global state attribute of the global positioning apparatus 701 is the global normal state, but the local state attribute of the local positioning apparatus 702 is the local abnormal state, then the pose fusing component 7032 determines the fused pose information according to the global pose information.

Figure 9:
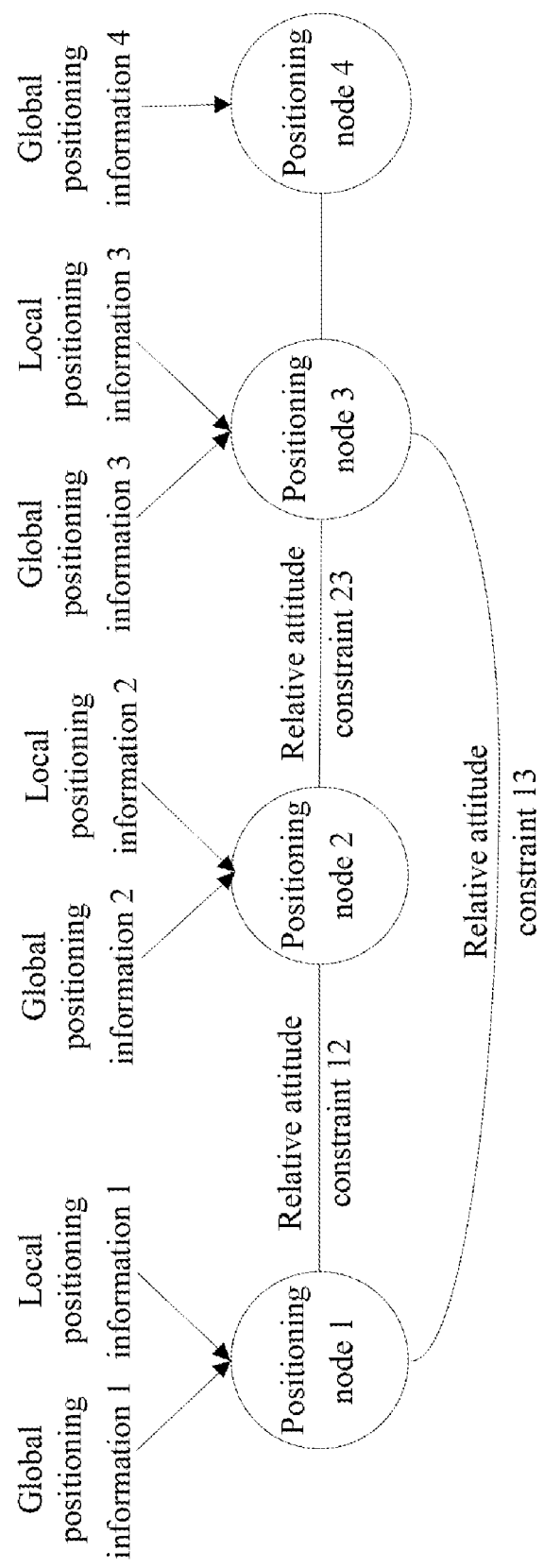
FIG. 9 is a second principle schematic diagram for determining fused pose information according to the present disclosure.

Illustratively, as shown in FIG. 9, a positioning node 4 is added on the basis of FIG. 8.

Since the local state attribute at positioning node 4 is the local abnormal state, the fused pose information at positioning node 4 is determined based on the global pose information.

For another example, if the global state attribute of the global positioning apparatus 701 is the global abnormal state, but the local state attribute of the local positioning apparatus 702 is the local normal state, then the pose fusing component 7032 fuses the local pose information to obtain the fused pose information.

Figure 10:
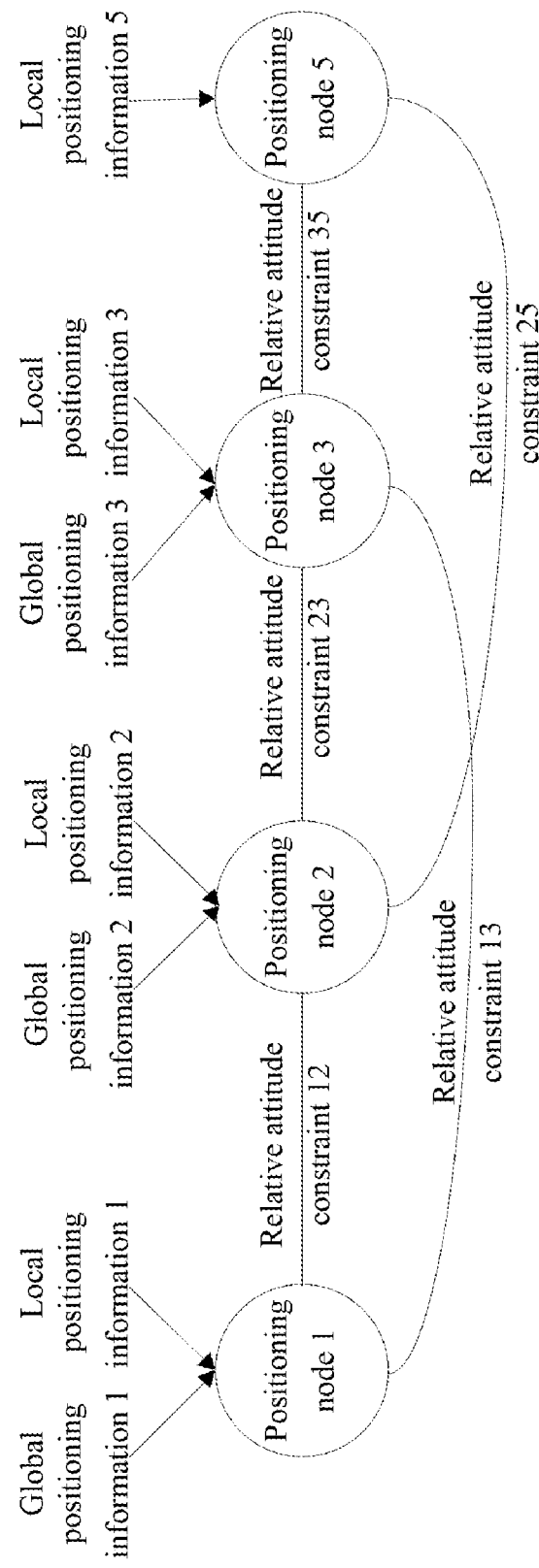
FIG. 10 is a third principle schematic diagram for determining fused pose information according to the present disclosure.

Illustratively, as shown in FIG. 10, a positioning node 5 is added on the basis of FIG. 8.

Since the global state attribute at positioning node 5 is the global abnormal state, the fused pose information at positioning node 5 is determined based on the local pose information.

As can be seen with reference to the above analysis and FIG. 10, in some other embodiments, at the positioning node 5, a relative attitude constraint 35 between the positioning node 3 and the positioning node 5 is established based on the local positioning information 3 and the local positioning information 5, and a relative attitude constraint 25 between the positioning node 2 and the positioning node 5 is established based on the local positioning information 2 and the local positioning information 5, and the position of the vehicle at the positioning node 5 is determined based on the relative attitude constraint 35, the relative attitude constraint 25, the local positioning information 5 at the positioning node 5.

For another example, if the global state attribute of the global positioning apparatus 701 is the global abnormal state, and the local state attribute of the local positioning apparatus 702 is the local abnormal state, then the pose fusing component 7032 outputs a notification message, to prompt that positioning cannot be performed.

The pose fusing component 7032 can further perform correction processing to the fused pose information according to the global attitude angle information output by the global positioning apparatus 701 and local attitude angle information output by the local positioning apparatus 702, to obtain the position of the vehicle.

In some embodiments, an up-converting apparatus can be further provided in the vehicle, and the up-converting apparatus is configured to perform up-conversion processing to the output frequency of the pose graph optimizing apparatus, to satisfy the requirement for positioning in the frequency level.

For example, if the frequency output by the pose graph optimizing apparatus is 15 HZ, the up-converting apparatus can up-convert the frequency of the pose graph optimizing apparatus to 125 HZ.

Figure 11:
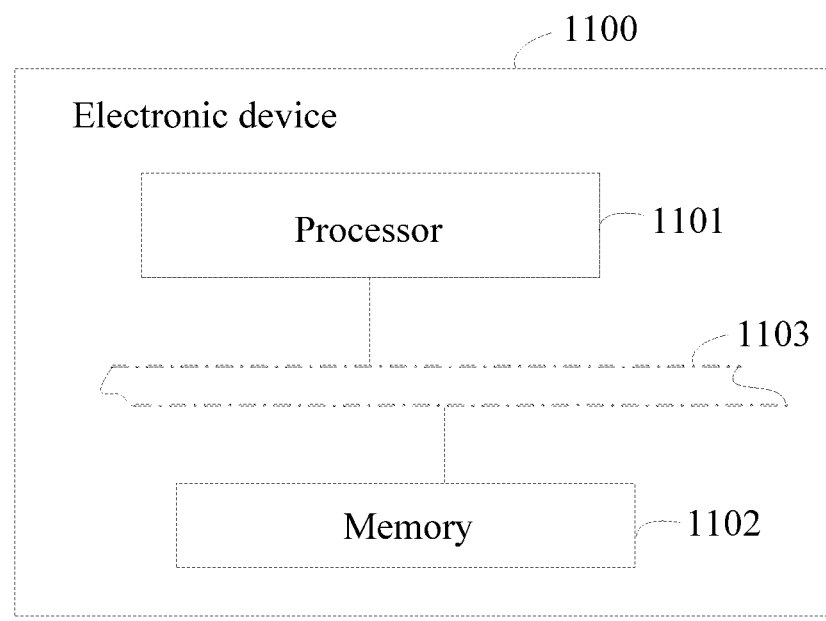
FIG. 11 is a schematic diagram according to a sixth embodiment of the present disclosure.

FIG. 11 is a schematic diagram according to a sixth embodiment of the present disclosure. As shown in FIG. 11, the electronic device 1100 in the present disclosure may include: a processor 1101 and a memory 1102.

The memory 1102 is configured to store programs; the memory 1102 may include volatile memory, such as a random access memory (abbreviated as RAM) and a static random-access memory (abbreviated as SRAM), a double data rate synchronous dynamic random access memory (DDR SDRAM), etc. The memory may also include a non-volatile memory, such as a flash memory. The memory 1102 is configured to store computer programs (such as application programs, functional modules, etc., implementing the above method), computer instructions, etc., which can be stored in one or more memories 1102 by partition. In addition, the above computer program, computer instruction, data, etc., can be called by the processor 1101.

The above computer program, computer instruction, etc., can be stored in one or more memories 1102 by partition. In addition, the above computer program, computer instruction, data, etc., can be called by the processor 1101.

The processor 1101 is configured to execute the computer program stored in the memory 1102, to implement the respective steps in the method relating to the above embodiments.

Related description in the above method embodiments can be specifically referred to.

The processor 1101 and the memory 1102 may be independent structures, and may also be an integrated structure integrated together. When the processor 1101 and the memory 1102 are independent structures, the memory 1102 and the processor 1101 may be coupled and connected though a bus 1103.

The electronic device of the present embodiment can perform the technical solution in the above method, and the specific implementation process and technical principle thereof are the same, which will not be repeated here.

It should be understood that, steps of the procedures of various forms as shown above can be reordered, added or deleted. For example, the steps described in the present disclosure can be performed in parallel, sequentially or in a different order, so long as the desired results of the technical solution disclosed in the present disclosure can be achieved, which is not restricted here.

The above embodiments do not constitute limitation to the protection scope of the present disclosure. Those skilled in the art should understand that various modifications, combinations, sub-combinations and substitutions can be made according to the design requirements and other factors. Any modification, equivalent substitution and improvement, etc., within the spirit and principle of the present disclosure should be included in the protection scope of the present disclosure.

What is claimed is:

1. A vehicle positioning method, comprising:
in response to determining that there is no high-definition map in a vehicle, acquiring intermediate pose information of the vehicle based on at least one of a global navigation satellite system and an inertial measurement unit in the vehicle, and determining the intermediate pose information as global positioning information, wherein the global positioning information comprises global pose information and global attitude angle information;
acquiring local positioning information of the vehicle, wherein the local positioning information is positioning information acquired by a positioning apparatus of the vehicle based on a coordinate system with an initial position of the vehicle as an origin point, and the local positioning information comprises local pose information and local attitude angle information, and performing fusion processing on the global pose information and the local pose information to obtain fused pose information; and
performing compensation processing on the fused pose information according to the global attitude angle information and the local attitude angle information to obtain a position of the vehicle;
wherein the global attitude angle information comprises a global roll angle and a global pitch angle, and the local attitude angle information comprises a local roll angle and a local pitch angle;
wherein the performing compensation processing on the fused pose information according to the global attitude angle information and the local attitude angle information to obtain a position of the vehicle comprises:
determining a first compensation parameter according to the global roll angle and the local roll angle, and determining a second compensation parameter according to the global pitch angle and the local pitch angle; and performing compensation processing on the fused pose information according to the first compensation parameter and the second compensation perameter to obtain the position of the vehicle.

2. The method according to claim 1, wherein the global pose information comprises previous-frame global pose information and current-frame global pose information, and a previous frame and a current frame are two adjacent frames in images in a traveling process of the vehicle; the performing fusion processing on the global pose information and the local pose information to obtain fused pose information comprises:
   determining a first inter-frame relative pose of the vehicle between two adjacent frames according to the previous-frame global pose information and the current-frame global pose information; and
   determining a global confidence degree of the global pose information according to the first inter-frame relative pose and the local pose information, and if the global confidence degree reaches a preset global confidence degree threshold, performing fusion processing on the global pose information and the local pose information to obtain the fused pose information, wherein the preset global confidence degree threshold is set by the positioning apparatus based on means of requirements, historical records and tests, and is used to represent a reliability degree of the global pose information.

3. The method according to claim 2, wherein the determining a global confidence degree of the global pose information according to the first inter-frame relative pose and the local pose information comprises:
   determining a second inter-frame relative pose according to the first inter-frame relative pose and the local pose information, wherein the second inter-frame relative pose is used to represent a discrepancy between the global pose information and the local pose information; and
   determining the global confidence degree according to the second inter-frame relative pose.

4. The method according to claim 3, wherein the local pose information comprises previous-frame local pose information and current-frame local pose information; the determining a second inter-frame relative pose according to the first inter-frame relative pose and the local pose information comprises:
   determining a third inter-frame relative pose of the vehicle between two adjacent frames according to the previous-frame local pose information and the current-frame local pose information; and
   determining a discrepant pose between the first inter-frame relative pose and the third inter-frame relative pose, and determining the discrepant pose as the second inter-frame relative pose.

5. The method according to claim 2, wherein the performing, if the global confidence degree reaches a preset global confidence degree threshold, fusion processing on the global pose information and the local pose information to obtain the fused pose information comprises:
   if the global confidence degree reaches the preset global confidence degree threshold, acquiring a local confidence degree corresponding to the local pose information, and if the local confidence degree reaches a preset local confidence degree threshold, performing fusion processing on the global pose information and the local pose information to obtain the fused pose information.

6. The method according to claim 2, further comprising:
   if the global confidence degree is smaller than the global confidence degree threshold, determining the position of the vehicle according to the local pose information.

7. The method according to claim 1, wherein the global pose information comprises previous-frame global pose information and current-frame global pose information, and a previous frame and a current frame are two adjacent frames in images in a traveling process of the vehicle; the performing fusion processing on the global pose information and the local pose information to obtain fused pose information comprises:
   determining a first inter-frame relative pose of the vehicle between two adjacent frames according to the previous-frame global pose information and the current-frame global pose information; and
   determining a global confidence degree of the global pose information according to the first inter-frame relative pose and the local pose information, and if the global confidence degree reaches a preset global confidence degree threshold, performing fusion processing on the global pose information and the local pose information to obtain the fused pose information, wherein the preset global confidence degree threshold is set by the positioning apparatus based on means of requirements, historical records and tests, and is used to represent a reliability degree of the global pose information.

8. The method according to claim 7, wherein the determining a global confidence degree of the global pose information according to the first inter-frame relative pose and the local pose information comprises:
   determining a second inter-frame relative pose according to the first inter-frame relative pose and the local pose information, wherein the second inter-frame relative pose is used to represent a discrepancy between the global pose information and the local pose information; and
   determining the global confidence degree according to the second inter-frame relative pose.

9. The method according to claim 8, wherein the local pose information comprises previous-frame local pose information and current-frame local pose information; the determining a second inter-frame relative pose according to the first inter-frame relative pose and the local pose information comprises:
   determining a third inter-frame relative pose of the vehicle between two adjacent frames according to the previous-frame local pose information and the current-frame local pose information; and
   determining a discrepant pose between the first inter-frame relative pose and the third inter-frame relative pose, and determining the discrepant pose as the second inter-frame relative pose.

10. The method according to claim 7, wherein the performing, if the global confidence degree reaches a preset global confidence degree threshold, fusion processing on the global pose information and the local pose information to obtain the fused pose information comprises:
   if the global confidence degree reaches the preset global confidence degree threshold, acquiring a local confidence degree corresponding to the local pose information, and if the local confidence degree reaches a preset local confidence degree threshold, performing fusion processing on the global pose information and the local pose information to obtain the fused pose information.

11. The method according to claim 7, further comprising:
if the global confidence degree is smaller than the global confidence degree threshold, determining the position of the vehicle according to the local pose information.

12. The method according to claim 1, further comprising:
in response to determining that there is a high-definition map stored in the vehicle, acquiring lane line information in the traveling process of the vehicle, and performing match processing on the lane line information and the high-definition map to obtain matched pose information; and
acquiring the intermediate pose information collected based on at least one of the global navigation satellite system and the inertial measurement unit, and generating global positioning information according to the matched pose information and the intermediate pose information.

13. The method according to claim 1, wherein the vehicle comprises an image-collecting apparatus, and the local pose information is visual odometer information determined based on the images in the traveling process of the vehicle collected by the image-collecting apparatus.

14. A vehicle positioning apparatus using the method according to claim 1, comprising:
at least one processor; and
a memory communicatively connected to the at least one processor; wherein
the memory stores an instruction executable by the at least one processor, and the instruction is executed by the at least one processor to cause the at least one processor to:
acquire, in response to determining that there is no high-definition map in a vehicle, intermediate pose information of the vehicle based on at least one of a global navigation satellite system and an inertial measurement unit in the vehicle;
determine the intermediate pose information as global positioning information, wherein the global positioning information comprises global pose information and global attitude angle information;
acquire local positioning information of the vehicle, wherein the local positioning information is positioning information acquired by a positioning apparatus of the vehicle based on a coordinate system with an initial position of the vehicle as an origin point, and the local positioning information comprises local pose information and local attitude angle information;
perform fusion processing on the global pose information and the local pose information to obtain fused pose information; and
perform compensation processing on the fused pose information according to the global attitude angle information and the local attitude angle information to obtain a position of the vehicle;
wherein the global attitude angle information comprises a global roll angle and a global pitch angle, and the local attitude angle information comprises a local roll angle and a local pitch angle;
wherein the performing compensation processing on the fused pose information according to the global attitude angle information and the local attitude angle information to obtain a position of the vehicle comprises:
determining a first compensation parameter according to the global roll angle and the local roll angle, and determining a second compensation parameter according to the global pitch angle and the local pitch angle; and
performing compensation processing on the fused pose information according to the first compensation parameter and the second compensation parameter to obtain the position of the vehicle.

15. A non-transitory computer-readable storage medium storing a computer instruction, wherein the computer instruction is used to cause a computer to perform the method according to claim 1.

16. An autonomous driving vehicle using the method according to claim 1, comprising:
a global positioning apparatus, configured to acquire, in response to determining that there is no high-definition map in a vehicle, intermediate pose information of the vehicle based on at least one of a global navigation satellite system an inertial measurement unit in the vehicle, and determine the intermediate pose information as global positioning information, wherein the global positioning information comprises global pose information and global attitude angle information;
a local positioning apparatus, configured to acquire local positioning information of the vehicle, wherein the local positioning information is positioning information acquired by the positioning apparatus of the vehicle based on a coordinate system with an initial position of the vehicle as an origin point and the local positioning information comprises local pose information and local attitude angle information; and
a pose image optimization apparatus, configured to perform fusion processing on the global pose information and the local pose information to obtain fused pose information, and perform compensation processing on the fused pose information according to the global attitude angle information and the local attitude angle information to obtain a position of the vehicle;
wherein the global attitude angle information comprises a global roll angle and a global pitch angle, and the local attitude angle information comprises a local roll angle and a local pitch angle;
wherein the performing compensation processing on the fused pose information according to the global attitude angle information and the local attitude angle informationn to obtain a position of the vehicle comprises:
determining a first compensation parameter according to the global roll angle and the local roll angle, and determining a second compensation parameter according to the global pitch angle and the local pitch angle; and
performing compensation proceessing on the fused pose information according to the first compensation parameter and the second compensation parameter to obtain the position of the vehicle.

17. The vehicle according to claim 16, wherein the local positioning apparatus comprises a visual odometer apparatus.

18. The vehicle according to claim 17, wherein the visual odometer apparatus comprises: an image-collecting apparatus, a global navigation satellite system and an inertial measurement unit.

* * * * *